(12) United States Patent
Watanabe

(10) Patent No.: US 10,061,110 B2
(45) Date of Patent: Aug. 28, 2018

(54) IMAGING APPARATUS, MICROSCOPE SYSTEM, AND IMAGING METHOD

(71) Applicant: OLYMPUS CORPORATION, Tokyo (JP)

(72) Inventor: Nobuyuki Watanabe, Kanagawa (JP)

(73) Assignee: OLYMPUS CORPORATION, Tokyo (JP)

(*) Notice: Subject to any disclaimer, the term of this patent is extended or adjusted under 35 U.S.C. 154(b) by 348 days.

(21) Appl. No.: 14/792,801

(22) Filed: Jul. 7, 2015

(65) Prior Publication Data

US 2015/0309299 A1 Oct. 29, 2015

Related U.S. Application Data

(63) Continuation of application No. PCT/JP2013/075168, filed on Sep. 18, 2013.

(30) Foreign Application Priority Data

Jan. 9, 2013 (JP) ................................. 2013-001776

(51) Int. Cl.
  *H04N 7/18* (2006.01)
  *G02B 21/36* (2006.01)
  (Continued)

(52) U.S. Cl.
  CPC ........... *G02B 21/365* (2013.01); *G02B 21/06* (2013.01); *G02B 21/241* (2013.01); *G02B 21/26* (2013.01); *G02B 21/362* (2013.01); *G02B 21/367* (2013.01)

(58) Field of Classification Search
  None
  See application file for complete search history.

(56) References Cited

U.S. PATENT DOCUMENTS 8,059,336 B2    11/2011  Ptitsyn et al.
8,422,127 B2     4/2013  Uchiyama et al.
(Continued)

FOREIGN PATENT DOCUMENTS

JP     H11-211439 A    8/1999
JP     2006-189510 A   7/2006
(Continued)

OTHER PUBLICATIONS

Japanese Office Action dated Apr. 25, 2017 in Japanese Patent Application No. 2013-001776.
(Continued)

*Primary Examiner* — James M Anderson, II
(74) *Attorney, Agent, or Firm* — Scully, Scott, Murphy & Presser, P.C.

(57) ABSTRACT

An imaging apparatus includes: a stage; an imaging unit having an imaging surface for receiving observation light from an object on the stage; a first moving mechanism for performing a relative movement between the stage and the imaging unit along at least one direction within a placement plane for placing the object; a second moving mechanism for performing a relative movement between the stage and the imaging unit along a direction orthogonal to the placement plane; a computation unit that causes the imaging unit to image a first region of the object while operating the first moving mechanism to acquire information on the first region, and calculates a focus tendency of the object; and a control unit that controls the second moving mechanism based on the focus tendency, and adjusts an imaging characteristic of the observation light when the imaging unit images a second region of the object.

11 Claims, 17 Drawing Sheets

(51) Int. Cl.
  *G02B 21/24*    (2006.01)
  *G02B 21/26*    (2006.01)
  *G02B 21/06*    (2006.01)

(56) References Cited

U.S. PATENT DOCUMENTS

| | | |
|---|---|---|
| 2008/0187208 A1 | 8/2008 | Shirota |
| 2009/0002811 A1* | 1/2009 | Uchiyama ............ G02B 21/241 359/383 |
| 2009/0231689 A1* | 9/2009 | Pittsyn .................... G01B 9/04 359/363 |
| 2009/0295963 A1 | 12/2009 | Bamford et al. |
| 2012/0120302 A1* | 5/2012 | Kiyota ................. G02B 21/244 348/345 |
| 2012/0287256 A1 | 11/2012 | Hulsken et al. |
| 2013/0084390 A1 | 4/2013 | Suzuki et al. |

FOREIGN PATENT DOCUMENTS

| | | |
|---|---|---|
| JP | 2008-191427 A | 8/2008 |
| JP | 2009-526272 A | 7/2009 |
| WO | 2006/098443 A1 | 9/2006 |
| WO | WO 2006/098443 A1 | 9/2006 |
| WO | 2008/137746 A1 | 11/2008 |
| WO | WO 2008/137746 A1 | 11/2008 |
| WO | 2011/080670 A1 | 7/2011 |
| WO | WO 2011/080670 A1 | 7/2011 |

OTHER PUBLICATIONS

International Search Report dated Dec. 3, 2013 issued in PCT/JP2013/075168.

* cited by examiner

PRIOR ART

IMAGING APPARATUS, MICROSCOPE SYSTEM, AND IMAGING METHOD

CROSS REFERENCES TO RELATED APPLICATIONS

This application is a continuation of PCT international application Ser. No. PCT/JP2013/075168 filed on Sep. 18, 2013 which designates the United States, incorporated herein by reference, and which claims the benefit of priority from Japanese Patent Application No. 2013-001776, filed on Jan. 9, 2013, incorporated herein by reference.

BACKGROUND

1. Technical Field

The disclosure relates to an imaging apparatus, a microscope system, and an imaging method for imaging an object to acquire an image.

2. Related Art

In recent years, an electronic imaging technique has progressed in the technical field of microscopic observation, and various imaging methods and image processing methods have been developed appropriately for an observation target. As an example, there has been proposed a system which displays a single image with a wide range and high definition by stitching a plurality of images obtained by imaging a plurality of regions within an object as an observation target. Such a system is also called a virtual slide system. For example, Japanese Laid-open Patent Publication No. 2008-191427 discloses a technique for dividing an observed region of a living tissue into small sections and connecting images acquired by imaging in each of the small sections.

In such an imaging technique, the number of times of performing imaging increases depending on the number of small sections. Thus, there is a need to increase the speed of an imaging operation. The increase in the imaging speed involves how to increase the speed of autofocus when imaging the small sections.

There has also been developed a technique for three-dimensionally displaying an object by extracting a confocal point from a plurality of images of the object observed with a microscope. Generally, in a confocal microscopy, it takes a long time to acquire image data since an optical system such as an objective lens should be operated in the optical axis direction (Z direction) in order to change a confocal plane.

In view of such a situation, Japanese Laid-open Patent Publication No. 11-211439 discloses a technique of focus-free imaging by moving a stage with tiling a focal plane on an object with respect to a moving direction (e.g., X direction) of the stage and performing imaging with changing the surface position of the object in the Z-axis direction. This technique can detect the object included in the thickness corresponding to the tilt angle of the focal plane, and thus eliminate the necessity of the operation in the Z direction.

In order to speed up the imaging operation in the virtual slide system, it would appear that a confocal imaging technique disclosed in Japanese Laid-open Patent Publication No. 11-211439 can be applied to the system disclosed in Japanese Laid-open Patent Publication No. 2008-191427. With this combination, the autofocus may not be required with respect to the small sections, thereby speeding up the imaging of the whole observed region.

However, a trade-off arises between a moving velocity on an object plane and a range of detectable thickness determined according to a tilt angle of a focal plane. With respect to an imaging apparatus capable of imaging an area of 200 µm wide at one time, for example, a case where a focal plane $P_{FC}$ is tilted by 10 µm in a thickness direction as shown in FIG. 18 is compared to a case where the focal plane $P_{FC}$ is tilted by 4 µm in the thickness direction as shown in FIG. 19. Each of imaging areas C1, C2, . . . shown in FIGS. 18 and 19 indicates an area on an object OB where image information can be acquired by a single imaging operation. In FIGS. 18 and 19, a scale size in a vertical direction is larger than that in a horizontal direction.

In FIG. 18, image information of 10 µm in the thickness direction can be acquired in a single imaging operation. In other words, the focal plane in the object OB can be searched within a range of 10 µm. In FIG. 19, on the other hand, only the image information of 4 µm in the thickness direction can be acquired. However, in tilt and image formation per 1 µm, for example, the imaging is performed by moving the stage by about 20 µm at a time in the case shown in FIG. 18 while the imaging can be performed by moving the stage by 50 µm at a time in the case shown in FIG. 19. Therefore, in the latter case, it is possible to take an image of the whole object OB with the smaller number of times of performing the imaging, i.e., in a short time.

For this reason, a smaller amount of tilt of the object is desirable in order to shorten the time of imaging the whole observation target. To meet this condition, however, it is necessary for the observation target to be located within a range in the thickness gave from the focal plane tilting.

In observing an object sandwiched between parallel plates, such as a prepared slide having a biological sample placed on a glass slide and sealed with a coverslip, the object is generally placed to be substantially orthogonal to an optical axis. In observing the object using the tilt and image formation described above, when the tilt amount of the focal plane increases, blurring on a non-focused region may be unnatural. Therefore, it is preferable to set the tilt amount appropriately to be controlled within a specified range.

Thus, in observing the object using the tilt and image formation, a suitable tilt amount of the focal plane for observation is set under various conditions, while the object plane needs to be in a Z-direction range defined according to the tilt amount of the focal plane.

When an object as an observation target is a biological sample, a prepared slide in many cases is not completely orthogonal to an optical axis due to an uneven thickness or the like of the biological sample. Therefore, the tilt of the prepared slide affects imaging significantly at a level of depth of focus. Consequently, auto-focusing is usually performed each time the observation region on the object changes. By comparison, the above-described observation with the tilt and image formation is a technique that does not require auto-focusing. It is, however, difficult to achieve both a Z-direction imaging range for compensating the tilted prepared slide or the above-described uneven thickness, and a throughput.

SUMMARY

In accordance with some embodiments, an imaging apparatus, a microscope system, and an imaging method are presented.

In some embodiments, an imaging apparatus includes: a stage on which an object is configured to be placed; an imaging unit including an imager having an imaging surface configured to receive observation light from the object; a first moving mechanism configured to perform a relative movement between the stage and the imaging unit along at least one direction within a placement plane for placing the object; a tilt mechanism configured to tilt a focal plane on an object side of the imaging unit relatively with respect to an axis parallel to a direction of movement by the first moving mechanism; a second moving mechanism configured to perform a relative movement between the stage and the imaging unit along a direction orthogonal to the placement plane; a computation unit configured to cause the imaging unit to image a first region of the object while causing the first moving mechanism to operate, acquire information on the first region based on a result of imaging, and calculate a focus tendency of the object; and a control unit configured to control the second moving mechanism based on the focus tendency, and adjust an imaging characteristic of the observation light on the imaging surface when causing the imaging unit to image a second region of the object that is different from the first region.

In some embodiments, a microscope system includes the above-described imaging apparatus, and an illumination unit configured to illuminate the object.

In some embodiments, an imaging method is executed by an imaging apparatus that includes: a stage on which an object is configured to be placed; an imaging unit including an imager having an imaging surface configured to receive observation light from the object; a first moving mechanism configured to perform a relative movement between the stage and the imaging unit along at least one direction within a placement plane for placing the object; a tilt mechanism configured to tilt a focal plane on an object side of the imaging unit relatively with respect to an axis parallel to a direction of movement by the first moving mechanism; and a second moving mechanism configured to perform a relative movement between the stage and the imaging unit along a direction orthogonal to the placement plane. The method includes: causing the imaging unit to image a first region of the object while causing the first moving mechanism to operate; acquiring information on the first region based on a result of imaging; calculating a focus tendency of the object; controlling the second moving mechanism based on the focus tendency; and adjusting an imaging characteristic of the observation light on the imaging surface when causing the imaging unit to image a second region of the object that is different from the first region.

The above and other features, advantages and technical and industrial significance of this invention will be better understood by reading the following detailed description of presently preferred embodiments of the invention, when considered in connection with the accompanying drawings.

DETAILED DESCRIPTION

An imaging apparatus and a microscope system according to some embodiments of the present invention will be described in detail with reference to the drawings. The present invention is not limited by these embodiments. The same reference sings are used to designate the same elements throughout the drawings.

First Embodiment

Figure 1:
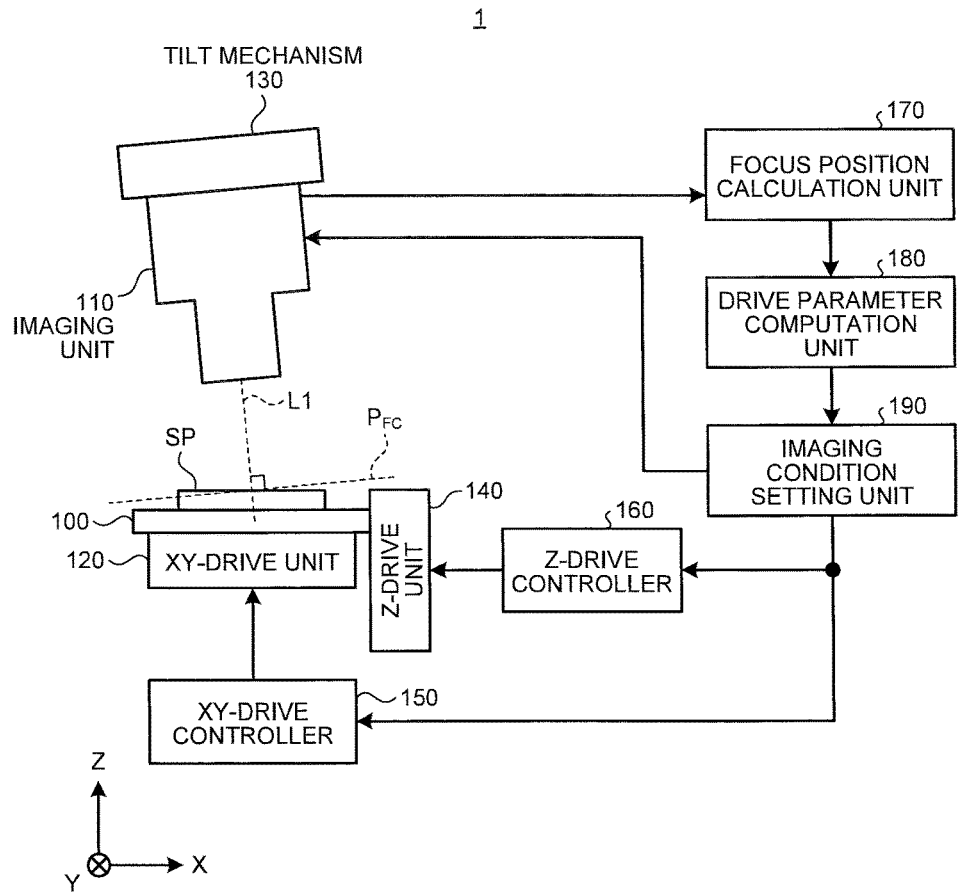
FIG. 1 is a schematic diagram illustrating a configuration of an imaging apparatus according to a first embodiment of the present invention.

FIG. 1 is a block diagram illustrating a schematic configuration of an imaging apparatus according to a first embodiment of the present invention. As illustrated in FIG. 1, an imaging apparatus 1 according to the first embodiment includes a stage 100 on which a sample SP to be observed is placed, and an imaging unit 110 for imaging the sample SP placed on the stage 100. In the following, a plane on which the sample is placed (hereinafter, referred to as a sample plane $P_{SP}$) of the stage 100 is defined as an XY-plane, and a direction orthogonal to the sample plane $P_{SP}$ is defined as a Z-direction.

The imaging apparatus 1 includes an XY-drive unit 120 configured to move the stage 100 in the XY-plane, a tilt mechanism 130 configured to tilt a focal plane $P_{FC}$, being on an object side of the imaging unit 110, with respect to an axis parallel to a moving direction of the stage 100, a Z-drive unit 140 configured to move the stage 100 in the Z-direction, an XY-drive controller 150 configured to control an operation of the XY-drive unit 120 to move the stage 100, a Z-drive controller 160 configured to control an operation of the Z-drive unit 140 to move the stage 100, a focus position calculation unit 170 configured to calculate a focus position of the sample SP in the Z-direction, based on image information acquired in imaging the sample SP by the imaging unit 110, a drive parameter computation unit 180 configured to calculate a drive parameter to be used for controlling the XY-drive unit 120 and the Z-drive unit 140, based on at least one-directional distribution of the focus positions in the XY-plane, and an imaging condition setting unit 190 configured to adjust an imaging characteristic of the imaging unit 110 in an imaging surface, by controlling the XY-drive unit 120 and the Z-drive unit 140 based on the drive parameter, while setting various imaging conditions on the imaging apparatus 1.

Figure 2:
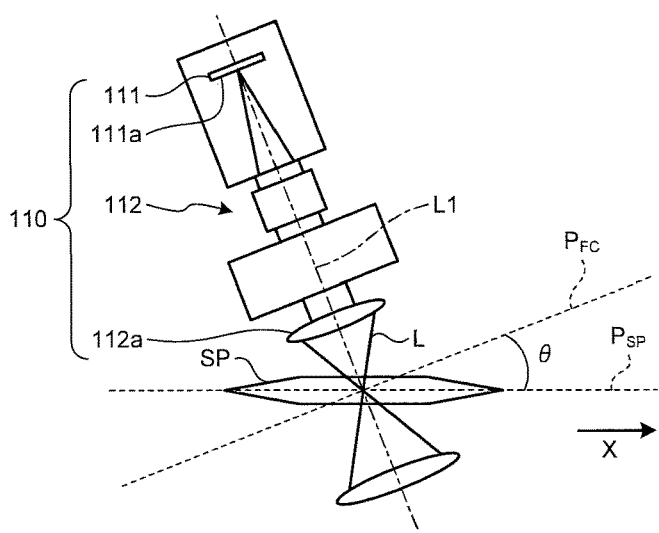
FIG. 2 is a schematic diagram illustrating a configuration of an imaging unit illustrated in FIG. 1.

FIG. 2 is a schematic diagram illustrating a configuration of the imaging unit 110 illustrated in FIG. 1. As illustrated in FIG. 2, the imaging unit 110 includes an imager 111 containing a solid-state imager such as a CCD, and an observation optical system 112 containing an objective lens 112a. The imager 111 has an imaging surface 111a configured to receive observation light L from the sample SP (transmitted or reflected light from the sample SP), and converts the light received in the imaging surface 111a into an electrical signal, thereby generating electronic image information (image data). The observation optical system 112 forms an image of observation light L from the sample SP, on the imaging surface 111a of the imager 111 In the first embodiment, the imaging surface 111a is formed orthogonal to an optical axis L1 of the observation optical system 112.

The tilt mechanism 130 illustrated in FIG. 1 holds the imaging unit 110 (imager) in a tilted state during an imaging operation of the imaging unit 110, so that the focal plane $P_{FC}$ on the object side of the imaging unit 110 can form an angle θ with respect to an axis parallel to the moving direction of the stage 100, as illustrated in FIG. 2. Specifically, the tilt mechanism 130 includes a rotating mechanism, which is rotatable around a Y-direction axis that is orthogonal to an X-axis, when the stage 100 is moved in the X-direction.

Referring back to FIG. 1, the XY-drive controller 150 controls the XY-drive unit 120 to move the stage 100 in a specified direction (X-direction, for example) during the imaging operation of the imaging unit 110. The Z-drive controller 160 controls the Z-drive unit 140 to set the focus position of the imaging unit 110 for the sample SP to a specified range in the imaging operation of the imaging unit 110.

Based on a result of the plurality of times of imaging (image information) obtained by imaging a region in the sample SP, with the stage 100 being moved by the XY-drive unit 120, the focus position calculation unit 170 calculates the focus position using a known method such as a contrast method or a phase difference method, and acquires a focus position distribution in at least one direction (X-direction, for example) on the XY-plane.

Figure 3A:
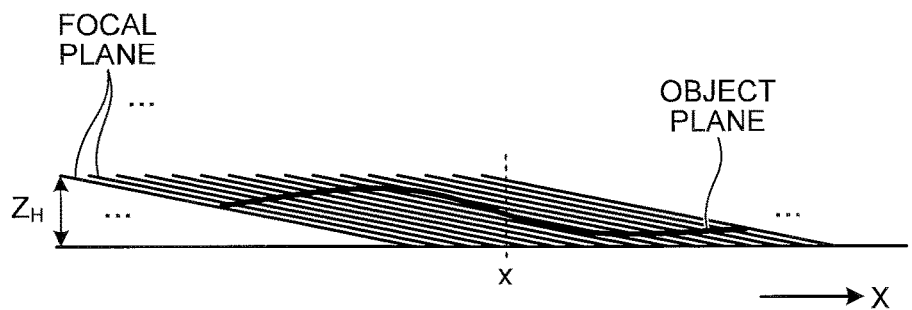
FIG. 3A is a schematic diagram illustrating a relationship between a focal plane and an object plane in imaging with tilt and image formation.
Figure 3B:
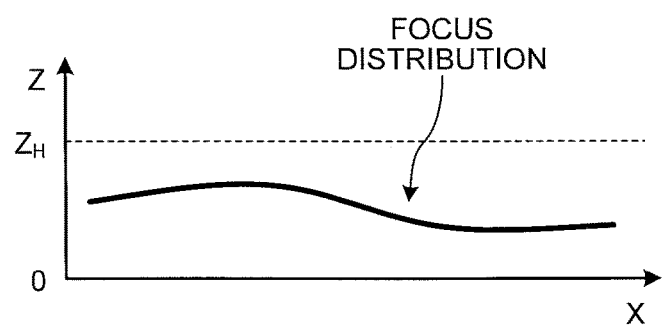
FIG. 3B is a diagram illustrating a focus position distribution (focus distribution) that corresponds to FIG. 3A.

FIG. 3A is a schematic diagram illustrating a relationship between the focal plane and an object plane (a surface of the sample SP, for example) in imaging with tilt and image formation for imaging the object by tilting the focal plane with respect to the moving direction of the stage 100 (X-direction, for example). FIG. 3B is a diagram illustrating the focus position distribution (focus distribution) that corresponds to FIG. 3A.

As illustrated in FIG. 3A, a point on the object plane (a point on coordinate x, for example) is imaged a plurality of times with tilt and image formation, a position of the point on a focal plane (the position in the Z-direction) being changed relatively with the movement of the stage 100. By comparing contrasts of luminance values in the Z-direction based on the plurality of images acquired in the plurality of imaging, the focus position of the object can be estimated. An image of the focus object can be thus acquired based on the estimated focus position. FIG. 3B illustrates the distribution of the estimated focus positions in the X-direction (focus distribution).

Alternatively, as disclosed in above-described Japanese Patent Application Laid-open No. 11-211439, it is also possible to acquire the focus position of the object by estimating a height position on the tilted plane, using the position in the X-direction where a focus evaluation value (e.g. focus at a confocal position) is the largest.

The drive parameter computation unit 180 calculates the drive parameter based on the focus position distribution calculated by the focus position calculation unit 170. The drive parameter is provided to the XY-drive controller 150 and the Z-drive controller 160 in order to drive the XY-drive unit 120 and the Z-drive unit 140, respectively.

As illustrated in FIG. 3A, a range of the object plane in the Z-direction is required to be within the focal plane range ($Z=0$ to $Z_H$, for example) when the imaging unit 110 is tilted. To achieve the imaging with tilt and image formation that fulfills the above-described requirement, the drive parameter computation unit 180 calculates the drive parameter to provide to each of the XY-drive controller 150 and the Z-drive controller 160, based on the focus position distribution acquired by the focus position calculation unit 170.

The imaging condition setting unit 190 sets various imaging conditions for the imaging with tilt and image formation, such as a tilt angle of the imaging unit 110 when tilted by the tilt mechanism 130, a moving speed or moving amount of the stage 100 when driven by the XY-drive unit 120, and the moving amount of the stage 100 when driven by the Z-drive unit 140.

Figure 4:
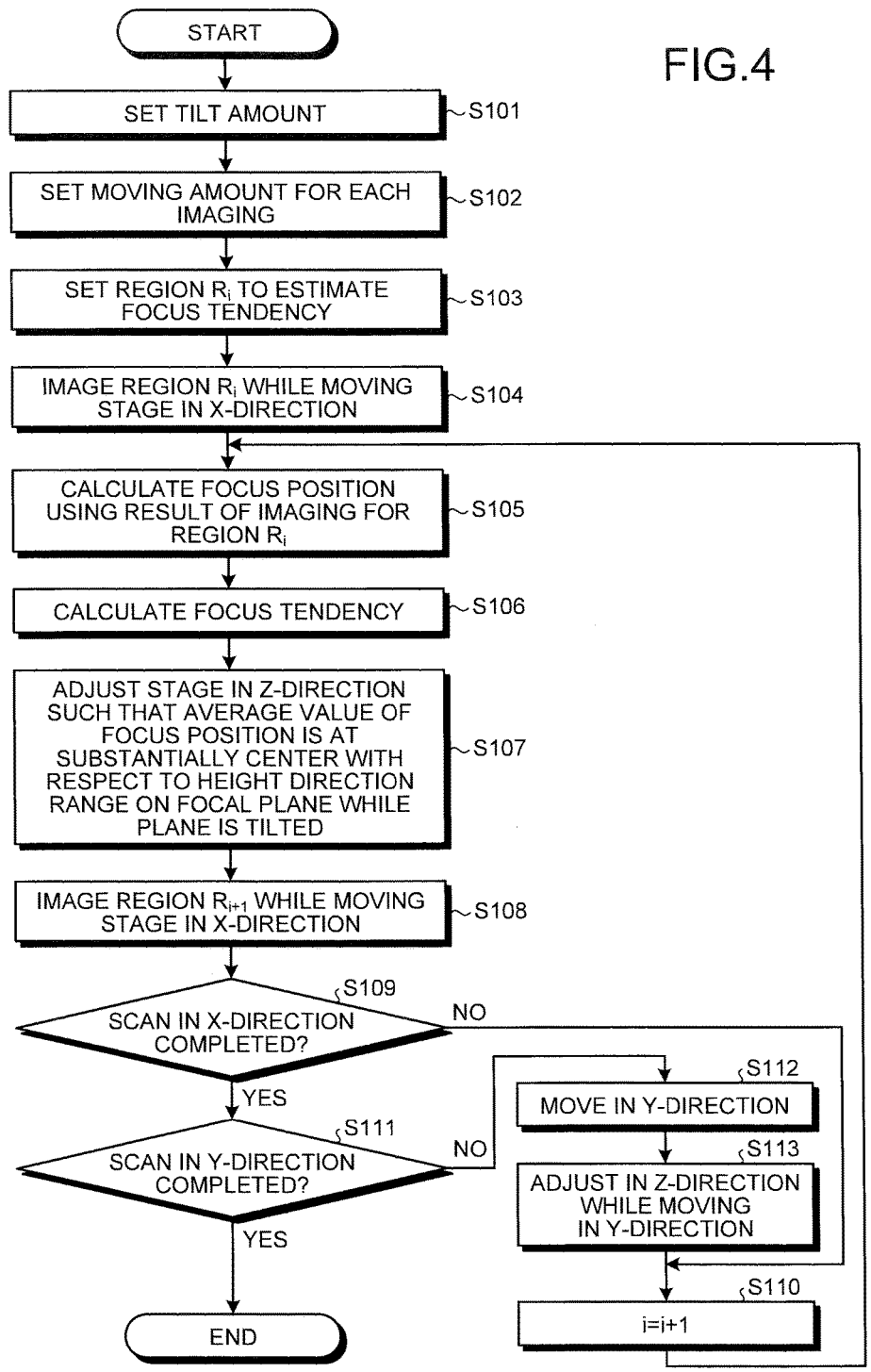
FIG. 4 is a flowchart illustrating an imaging method according to the first embodiment.
Figure 5A:
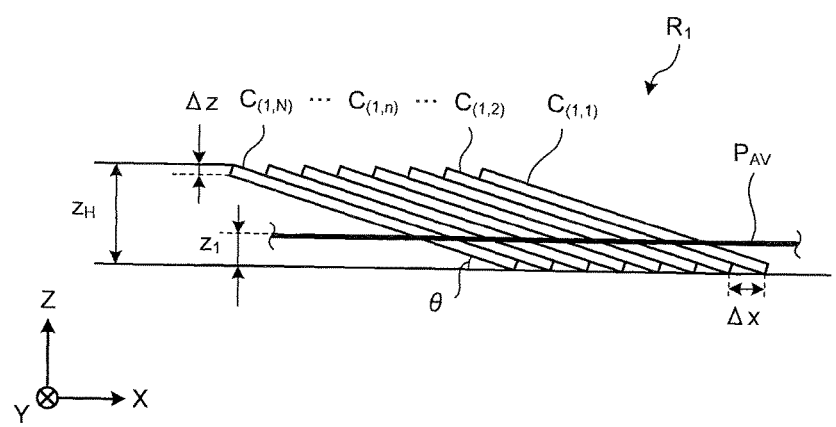
FIG. 5A is a schematic diagram illustrating the imaging method according to the first embodiment.
Figure 5B:
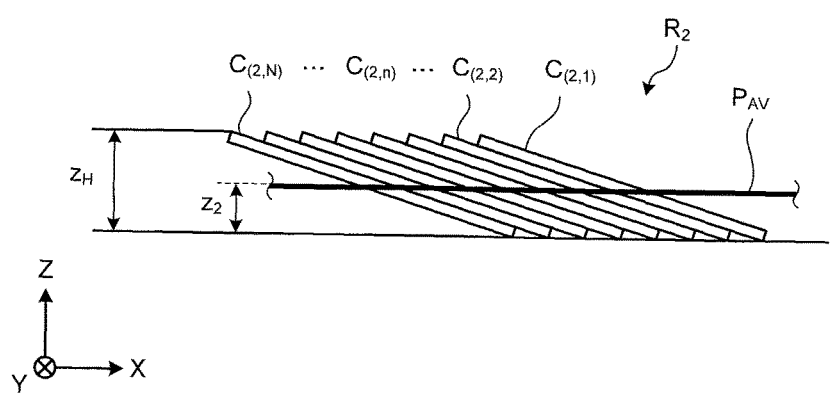
FIG. 5B is a schematic diagram illustrating the imaging method according to the first embodiment.

An imaging method according to the first embodiment will be described below. FIG. 4 is a flowchart describing the imaging method according to the first embodiment. FIGS. 5A and 5B are schematic diagrams illustrating the imaging method according to the first embodiment. In the following, the stage 100 is assumed to be moved in the X-direction.

In step S101, the imaging condition setting unit 190 sets a tilt angle θ of a focal plane $C_{(i,n)}$ of the imaging unit 110 in the imaging with tilt and image formation. Note that a sign n refers to a parameter (n=1 to N) representing an order of shooting in the imaging with tilt and image formation for a specified region. A sign "i" will be described later.

It is preferable that the tilt angle θ be small in order to reduce the time needed for imaging the entire sample SP. To achieve this, a thickness of the sample SP needs to be within a height range $Z_H$ of the focal plane $C_{(i,n)}$. Accordingly, the imaging condition setting unit 190 sets the tilt angle θ appropriately considering an existence range of the sample SP in the sample plane $P_{SP}$, the thickness of the sample SP, a limited imaging time, or the like.

In step S102, the imaging condition setting unit 190 sets a moving amount Δx of the stage 100 for one imaging appropriately, based on a depth of field and the tilt angle θ of the imaging unit 110. A sign Δz illustrated in FIG. 5A represents a Z-direction range where the object is detectable by one imaging with the imaging unit 110, and the range is determined by the depth of field and the tilt angle θ.

In step S103, the imaging condition setting unit 190 sets a region $R_i$ for estimating a focus tendency of the sample SP. The focus tendency represents a tendency of a height in the Z-direction where a focus plane $P_{AV}$ for the sample SP is estimated to exist in a region on the XY-plane.

The region $R_i$ is a region generated by dividing a sample SP existence region (i.e., a target region for imaging) on the sample plane $P_{SP}$ into a matrix. A sign i is a parameter to indicate each target region for imaging, and an initial value is set to 1. The maximum value of the parameter i is the number of divided regions on the sample SP existence region.

A size of each region $R_i$ is set so that a sufficient amount of information needed to estimate the focus tendency can be acquired. Specifically, the region $R_i$ is set to the size where the image information for 50 shots (N=50) can be acquired in the imaging with tilt and image formation for one region $R_i$.

In step S104, the imaging apparatus 1 images a region $R_i$ (imaging with tilt and image formation) while moving the stage 100 in the X-direction according to the conditions set by the imaging condition setting unit 190.

In step S105, the focus position calculation unit 170 calculates the focus position (position in the Z-direction) on each position (each of XY coordinates) within the region $R_i$ based on a result of imaging for the region $R_i$. More specifically, the focus position calculation unit 170 acquires, from the imaging unit 110, the image information for the plurality of shots (50 shots, for example) acquired by the imaging with tilt and image formation in step S104. Based on the acquired image information, the focus position calculation unit 170 calculates the focus evaluation value that indicates a contrast level of the luminance value in the Z-direction with respect to the XY-coordinates in the region $R_i$, and then calculates, as the focus position on the XY-coordinates, a Z-direction position where the focus evaluation value is the largest.

In step S106, the drive parameter computation unit 180 calculates the focus tendency of the sample SP. In the first embodiment, the drive parameter computation unit 180 calculates, as the focus tendency, an average value $z_1$ as a representative value of the focus positions, based on the focus position distribution in the X-direction calculated in step S105 (refer to FIG. 5A). A plane parallel to the XY-plane and containing this average value $z_1$ is determined as the focus plane $P_{AV}$ in the region $R_i$. The average value $z_1$ is used as the drive parameter to control operations of the Z-drive controller 160. As a representative value, the maximum value or another statistical value can be used instead of the average value.

In step S107, the imaging condition setting unit 190 adjusts the stage 100 in the Z-direction such that the average value $z_1$ of the focus positions is substantially at a center (in a specified range from a center of a height-direction range $z_H$) with respect to the height-direction range $z_H$ of the focal plane $C_{(i,n)}$ with the plane being tilted. As illustrated in FIG. 5A, for example, when the focus plane $P_{AV}$ is at a lower position than a center of the height-direction range $z_H$ of the focal plane $C_{(i,n)}$, the stage 100 is moved downward to relatively raise the focus plane $P_{AV}$, to set, as illustrated in FIG. 5B, the height $z_2$ of the focus plane $P_{AV}$ to: $z_2=z_H/2$. Accordingly, an imaging characteristic of the observation light in the imaging unit 110 changes; that is, the position of the image of the sample SP to be formed on the imaging surface changes.

In step S108, the imaging apparatus 1 images a region $R_{i+1}$ which is adjacent to the region $R_i$ by moving the stage 100 according to the conditions set by the imaging condition setting unit 190. Accordingly, the imaging with tilt and image formation is performed to a region $R_1$ illustrated in FIG. 5A and then to a region $R_2$ illustrated in FIG. 5B.

In step S109, the imaging apparatus 1 determines whether a scan on the sample SP in the X-direction is completed. When the scan is not completed (step S109: No), the parameter i, which represents a target region for imaging, is incremented (step S110), and the operation of the imaging apparatus 1 proceeds to step S105. Thereafter, based on a result of imaging in step S108, the focus position is calculated (step S105), and steps S106 to S109 are repeated.

When the scan is completed in the X-direction (step S109: Yes), on the other hand, the imaging apparatus 1 then determines whether the scan for the sample SP in the Y-direction is completed (step S111). When the scan is not completed (step S111: No), the imaging apparatus 1 moves the stage 100 in the Y-direction, according to the size of the region $R_i$ (step S112).

In step S113, the imaging apparatus 1 adjusts the stage 100 in the Z-direction, along with the stage movement in the Y-direction. More specifically, using a result of imaging for the region $R_{i+1}$ in previous step S108, the imaging apparatus 1 calculates the focus position of the region $R_{i+1}$, and sets the drive parameter acquired based on the focus position in a similar manner as in the X-direction, and operates the Z-drive unit 140.

When the scan in the Y-direction is completed (step S111: Yes), the imaging apparatus 1 finishes operation.

According to the first embodiment of the present invention as described above, the imaging apparatus 1 scans the sample SP while estimating a focus range in the Z-direction based on the result of a previous imaging for the region $R_i$. Accordingly, even when a tilt amount (tilt angle θ) of the focal plane $C_{(i,n)}$ is suppressed to the necessary minimum, the imaging can be continued without causing the object plane to depart from a height-direction range of the focal plane, with the plane being tilted, making it possible to reliably acquire the focus plane, independently of a displacement of the object plane in the Z-direction. As a result, a takt time can be suppressed.

In the above-described first embodiment, the imaging with tilt and image formation is achieved by fixing the position of the imaging unit 110 and by moving the stage 100 in the XY-plane with the sample SP placed on the stage 100, equivalent to a status when both are moving relatively to each other. Alternatively, it is possible to fix the sample SP and to move the imaging unit 110. In the above-described first embodiment, an imaging characteristic of the imaging unit 110 is adjusted by fixing the position of the imaging unit 110, and by moving the stage 100 in the Z-direction. Alternatively, the sample SP may be fixed and the imaging unit 110 may be moved.

In addition, in adjusting the imaging characteristic, it may be sufficient to be able to adjust a relative positional relationship between the focal point position in the optical axis direction of the imaging unit 110 and the stage 100 on which the sample SP is placed. Therefore, for example, it is possible to adjust the position of an imaging surface of the imaging unit 110 in the Z-direction. It is also possible to partially move the optical system of the imaging unit 110 to change the focal position.

Modification 1-1

Modification 1-1 of the first embodiment of the present invention will be described below.

Figure 6:
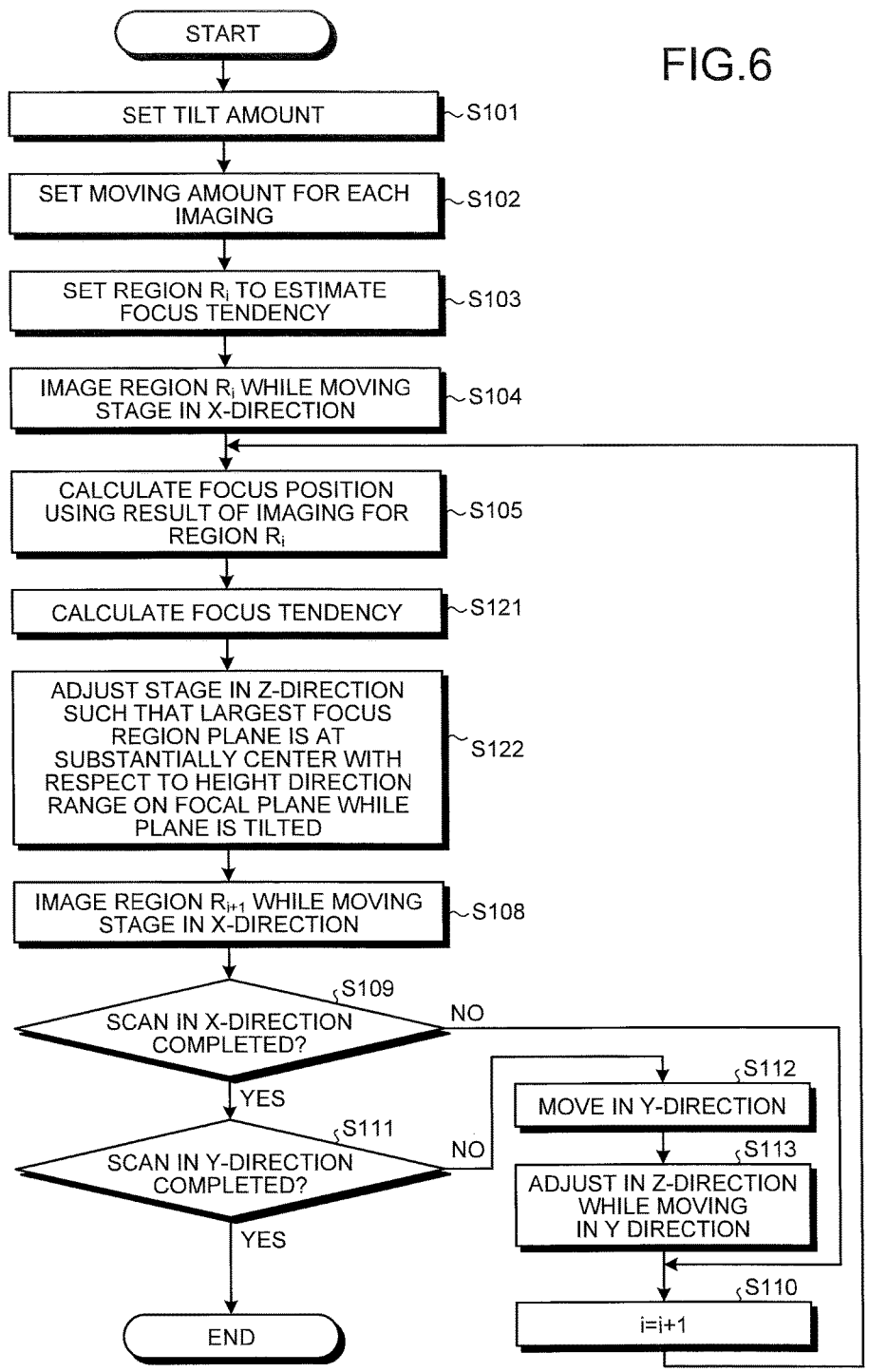
FIG. 6 is a flowchart illustrating an imaging method according to modification 1-1 of the first embodiment of the present invention.
Figure 7:
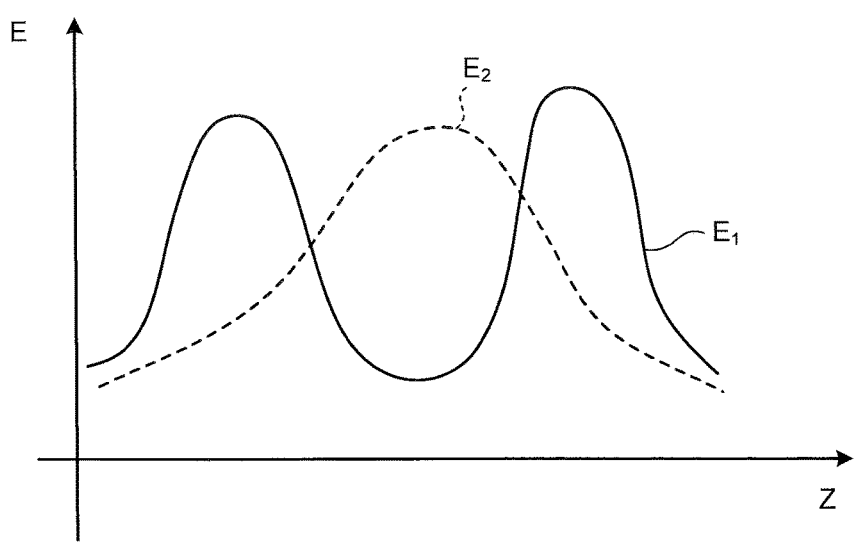
FIG. 7 is a graph illustrating the imaging method according to modification 1-1.

FIG. 6 is a flowchart illustrating an imaging method according to modification 1-1. FIG. 7 is a graph illustrating the imaging method according to modification 1-1. A configuration of an imaging apparatus according to modification 1-1 is similar to the configuration in the first embodiment.

Operations in steps S101 to S105 and in steps S108 to S113, illustrated in FIG. 6, are similar to the operations in the first embodiment.

In step S121 following step S105, the drive parameter computation unit 180 calculates a focus tendency of the sample SP. In modification 1-1 of the first embodiment, the drive parameter computation unit 180 calculates, as the focus tendency, the plane where the region being focus with the sample SP (i.e., having the highest focus evaluation value) has the largest total area (i.e., a largest focus region plane), among the planes parallel to the XY-plane and containing each Z-coordinate, based on the focus position distribution on the XY-plane calculated in step S105.

In step S122, the imaging condition setting unit 190 adjusts the stage 100 in the Z-direction such that the above-described largest focus region plane is substantially at a center (height in a specified range from a center of the height-direction range $z_H$) with respect to the height-direction range $z_H$ of the focal plane $C_{(i,n)}$ with the stage being tilted. After this, the operation of the imaging apparatus 1 proceeds to step S108.

Note that when the sample SP has a two-step structure or a transparent two-layer structure, the focus evaluation value is in some cases high in the vicinity of upper and lower surfaces of the sample SP. Thus, when the distribution of focus evaluation values $E_1$ in the Z-direction has a plurality of peaks (refer to FIG. 7), the average value of the focus positions does not always provide useful information to an observer. Furthermore, as focus evaluation values $E_2$, even when the focus evaluation values present a unimodal distribution, the average value of the focus position is not always the height where the region $R_i$ is focus in the largest range.

Therefore, in modification 1-1, the largest focus region plane is calculated based on the focus position distribution on the XY-plane calculated in step S105, to determine the largest focus region plane as the focus plane in the region $R_i$. Accordingly, even when the tilt amount (tilt angle θ) of the focal plane $C_{(i,n)}$ is suppressed to the necessary minimum, the imaging can be continued without causing the focus plane, which contains a lot of useful information to the observer, to depart from a height-direction range of the focal plane, with the plane being tilted. As a result, the takt time can be suppressed.

In calculating a total area of the region being focus to the sample SP in step S121, a micro-region is relatively significantly affected by a noise. Therefore, it is possible to provide a specified threshold and include, in the calculation of the total area, only the area of a region where the area of the focused region is larger than the threshold.

In calculating the total area of the focus region in step S121, calculating an integrated value of the area of the focus region and the focus evaluation value, and then adding the integrated value is also possible, instead of simply adding the area of the focus region.

Second Embodiment

A second embodiment of the present invention will be described below.

Figure 8:
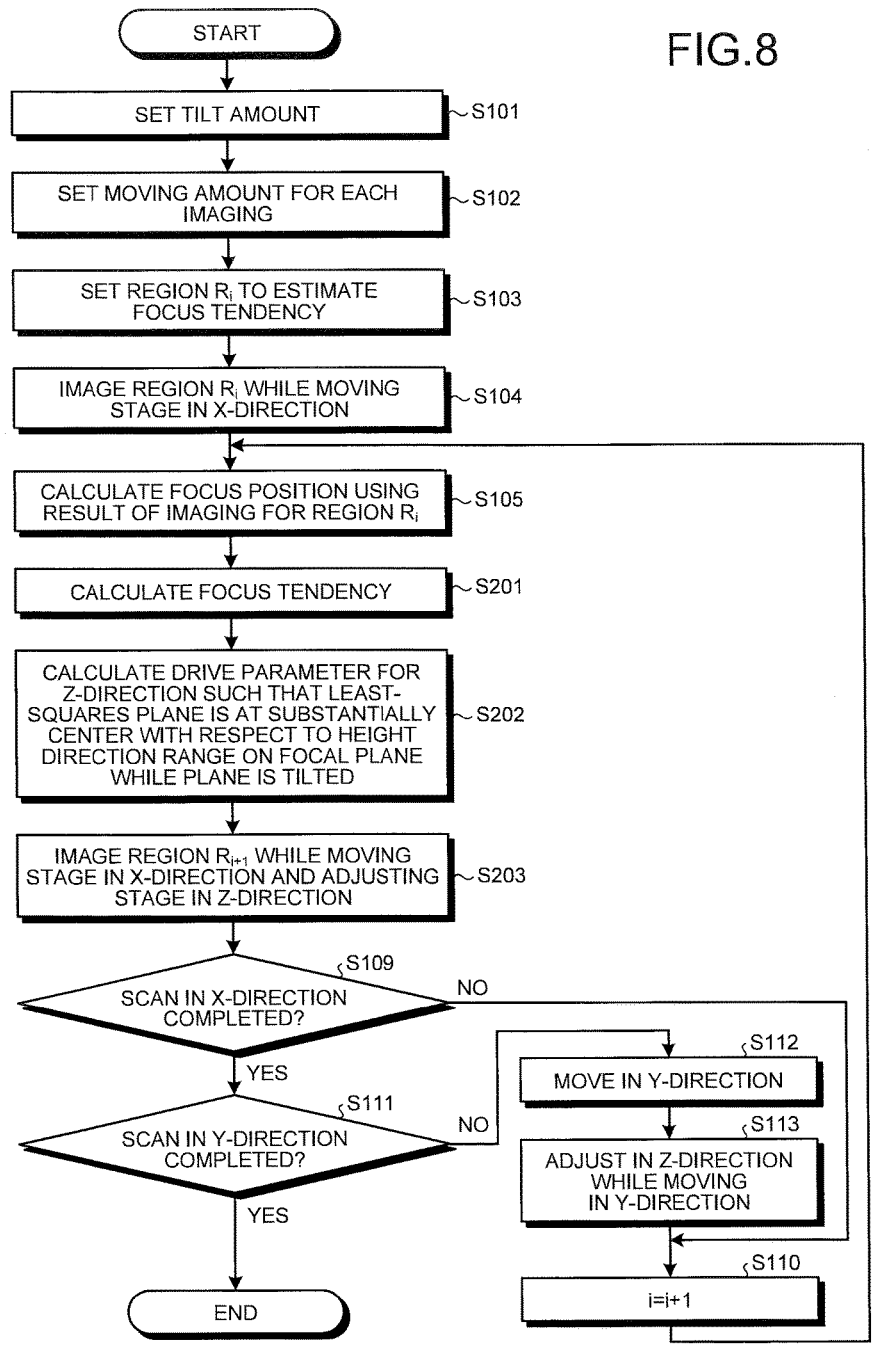
FIG. 8 is a flowchart illustrating an imaging method according to a second embodiment.
Figure 9A:
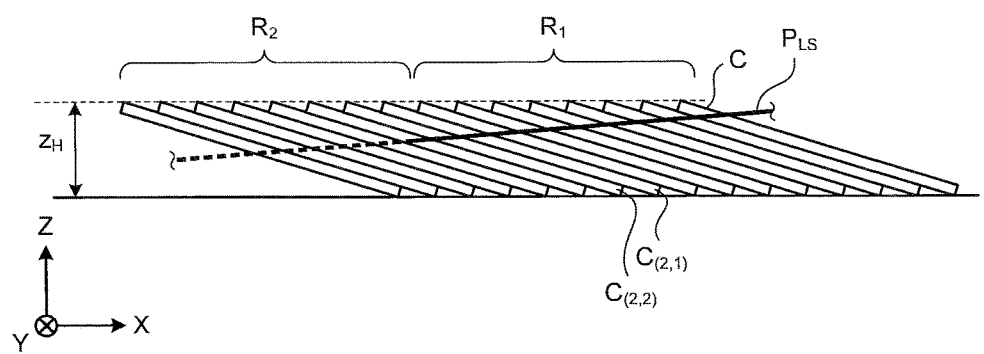
FIG. 9A is a schematic diagram illustrating the imaging method according to the second embodiment.
Figure 9B:
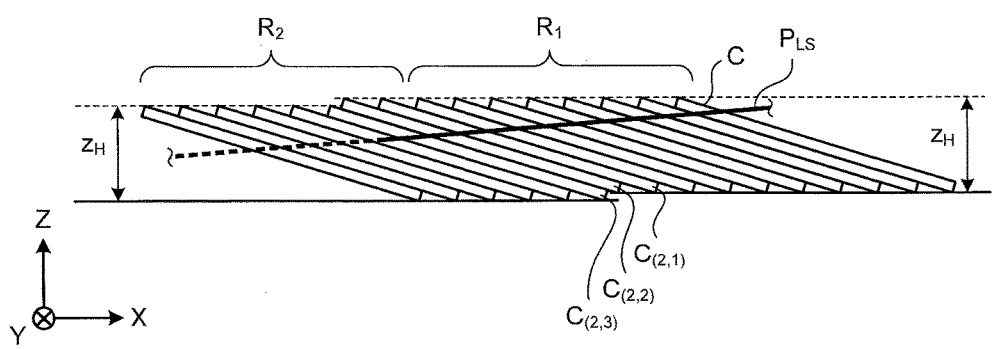
FIG. 9B is a schematic diagram illustrating the imaging method according to the second embodiment.
Figure 10:
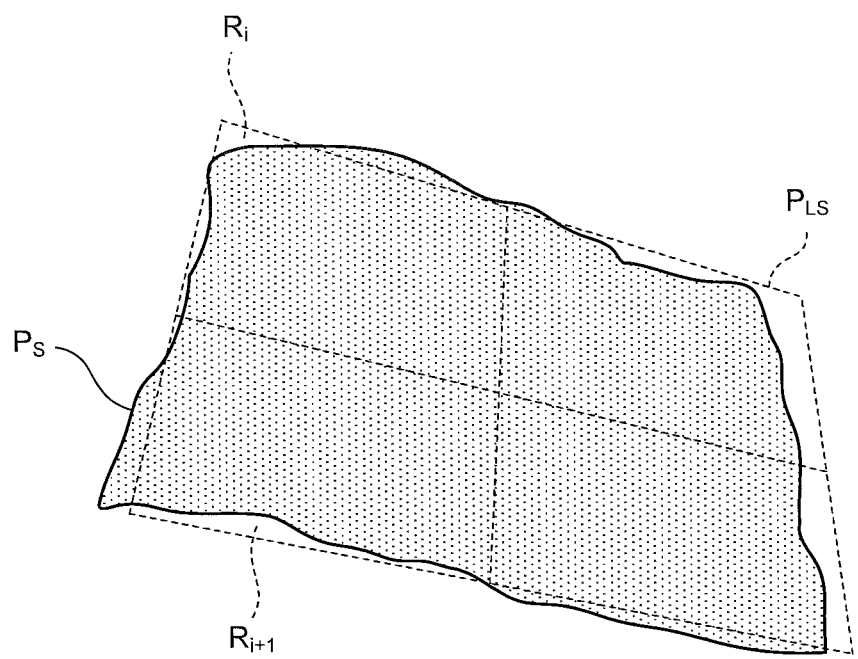
FIG. 10 is a schematic diagram illustrating the imaging method according to the second embodiment.

FIG. 8 is a flowchart illustrating an imaging method according to the second embodiment. FIGS. 9A to 10 are schematic diagrams illustrating the imaging method according to the second embodiment. A configuration of an imaging apparatus according to the second embodiment is similar to the configuration of the first embodiment.

Operations in steps S101 to S105 and in steps S109 to S113, illustrated in FIG. 8, are similar to the operations in the first embodiment.

In step S201 following step S105, the drive parameter computation unit 180 calculates a focus tendency of a sample SP. In the second embodiment, the drive parameter computation unit 180 calculates, as a focus tendency, a least-squares plane based on the positional coordinate of the focus position (hereinafter, referred to as a focus position coordinate) calculated in step S105. In FIG. 9A, for example, a least-squares plane $P_{LS}$ is calculated based on a result of imaging for a region $R_i$. The least-squares plane can be obtained by using an ordinary least-square method.

In step S202, the drive parameter computation unit 180 calculates a drive parameter in the Z-direction such that the least-squares plane calculated in step S201 is substantially at a center with respect to a height-direction range of a focal plane, with the plane being tilted.

In step S203, the imaging apparatus 1 images a region $R_{i+1}$, while adjusting the stage 100 in the Z-direction and moving the stage in the X-direction, according to the drive parameter set in step S202. As illustrated in FIGS. 9A to 9B, after completion of the imaging for a region $R_2$ in focal planes $C_{(2,1)}$ and $C_{(2,2)}$, the stage 100 is adjusted such that the least-squares plane $P_{LS}$ is substantially at a center (in a specified range from the center of a height range $z_H$), with respect to the height range $z_H$ of a focal plane $C_{(2,3)}$. With this status, the imaging is performed on the focal plane $C_{(2,3)}$. Then, the operation of the imaging apparatus 1 proceeds to step S109.

As illustrated in FIG. 10, an object plane $P_S$ (a surface of the sample SP, for example) usually exists continuously. Therefore, the least-squares plane $P_{LS}$ calculated based on the focus position coordinate in the region $R_i$ is assumed to estimate the object plane $P_S$ in the region $R_{i+1}$ or the like, near the region $R_i$. Accordingly, a focus plane estimation accuracy can be improved by setting drive parameters for the Z-drive unit 140 for the imaging in the adjacent region $R_{i+1}$ or the like, based on the least-squares plane $P_{LS}$.

Specifically, as illustrated in FIG. 9A, the least-squares plane $P_{LS}$ estimated based on the result of imaging for the region $R_1$ appears to be descending leftward in the X-direction. Therefore, as illustrated in FIG. 9B, the stage 100 is moved upward along with the moved imaging range due to the moved stage 100. This movement of the stage shifts the least-squares plane $P_{LS}$ downward relatively, and keeps the least-squares plane $P_{LS}$ substantially at a center in the height range of the focal plane $C_{(2,3)}$.

As described above, in the second embodiment, the height of the stage 100 in the Z-direction is adjusted as appropriate while a focus-achievable range is being estimated, based on the least-squares plane calculated based on the result of imaging for the region $R_1$. Therefore, the second embodiment makes it possible to improve a focus plane estimation accuracy for the shots to be imaged. Accordingly, even when the tilt amount of the focal plane is suppressed to the necessary minimum, the imaging can be continued without causing the object plane to depart from a height-direction range of the focal plane, with the plane being tilted. As a result, the takt time can be suppressed.

Figure 11A:
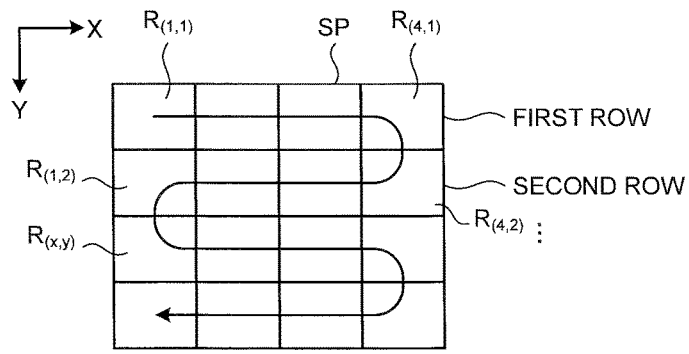
FIG. 11A is a schematic diagram illustrating an adjustment method in the Z-direction based on a least-squares plane in the Y-direction.
Figure 11B:
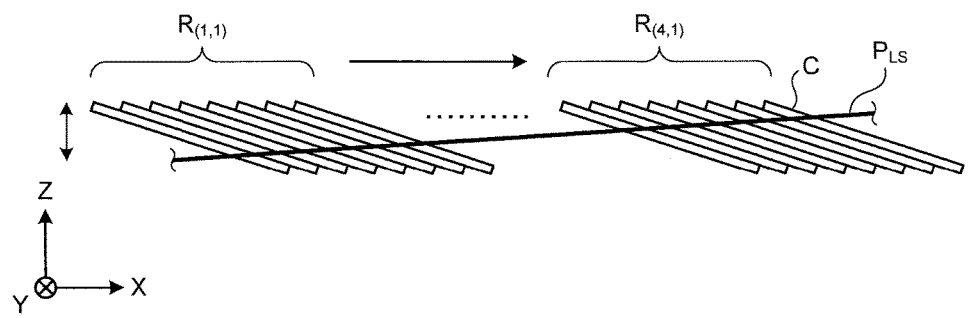
FIG. 11B is a schematic diagram illustrating the adjustment method in the Z-direction based on the least-squares plane in the Y-direction.
Figure 11C:
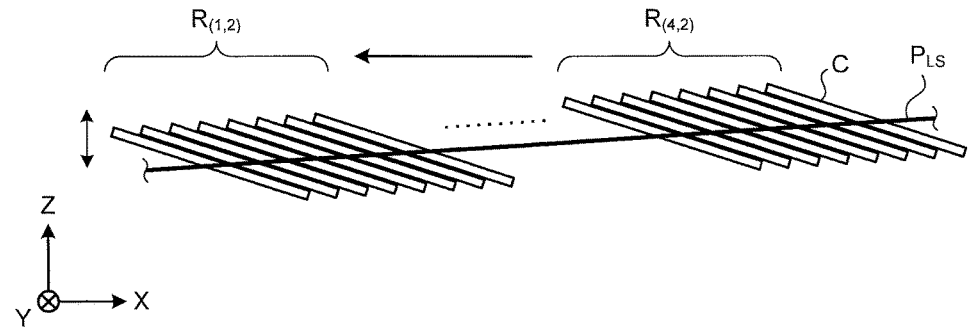
FIG. 11C is a schematic diagram illustrating the adjustment method in the Z-direction based on the least-squares plane in the Y-direction.

The adjustment in the Z-direction based on the above-described least-squares plane may be applicable to the scan on the sample SP in the Y-direction as well as the scan in the X-direction. As illustrated in FIG. 11A, for example, a sample SP existence region is divided into a matrix, where each divided region $R_{(x,y)}$ is scanned. In this case, when the scan for regions $R_{(1,1)}$ to $R_{(4,1)}$ in the first row is completed (refer to FIG. 11B), the least-squares plane $P_{LS}$ based on the result of imaging for each scanned region has been calculated. That is, the focus plane tendency for the second row, adjacent to the first row, is known already. Therefore, it may be sufficient to image regions $R_{(1,2)}$ to $R_{(4,2)}$ in the second row, while the height of the stage 100 is adjusted such that the least-squares plane $P_{LS}$ is substantially at a center in the height range of the focal plane based on the already calculated least-squares plane $P_{LS}$ (refer to FIG. 11C).

In the above description, the least-squares plane is calculated every time the result of imaging for the region $R_i$ is acquired. An alternative method may be calculating the least-squares plane once, and then, scanning the plurality of regions $R_i$ based on a tilt tendency of the least-squares plane. In this case, it is possible to decrease a computation amount in the drive parameter computation unit 180 and improve the processing speed.

In the above description, the least-squares plane is calculated based on the result of imaging for the region $R_i$. Another technique may be estimating a quadratic surface using the least square method based on the result of imaging for the region $R_i$ and, based on this quadratic surface, setting a drive parameter to adjust the stage 100 in imaging the region $R_{i+1}$.

Third Embodiment

A third embodiment of the present invention will be described as below.

Figure 12:
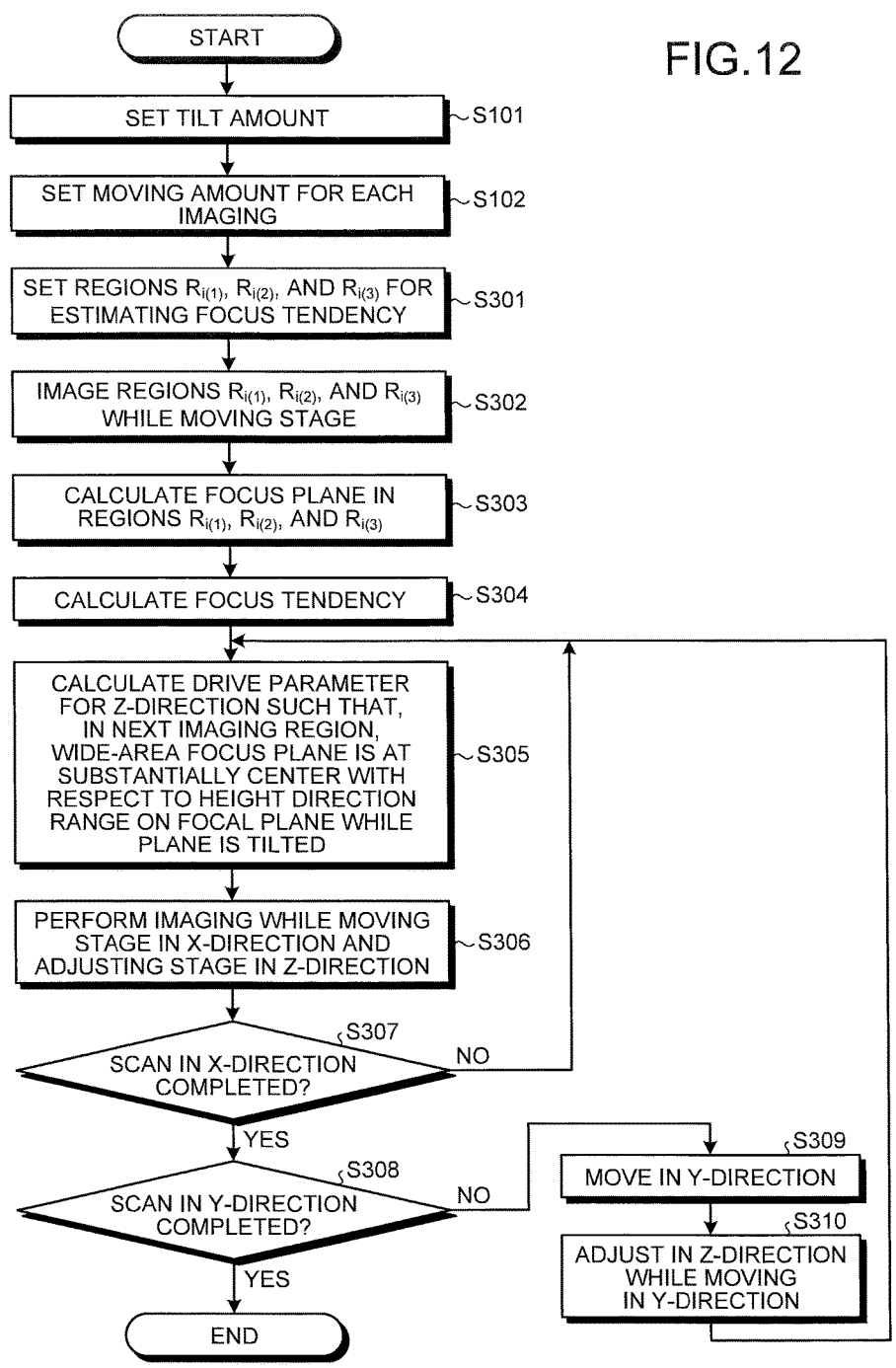
FIG. 12 is a flowchart illustrating an imaging method according to a third embodiment.
Figure 13:
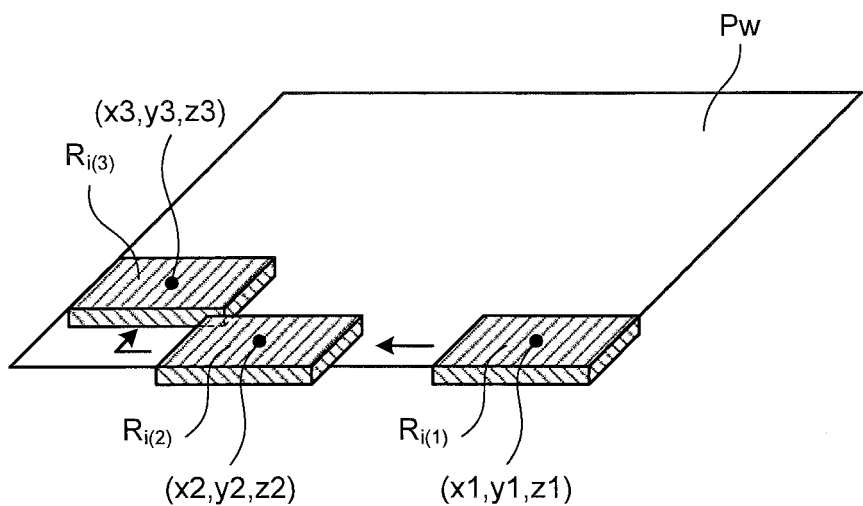
FIG. 13 is a schematic diagram illustrating the imaging method according to the third embodiment.

FIG. 12 is a flowchart illustrating an imaging method according to the third embodiment of the present invention. FIG. 13 is a schematic diagram illustrating the imaging method according to the third embodiment. A configuration of the imaging apparatus according to the third embodiment is similar to the configuration of the first embodiment.

Steps S101 and S102 illustrated in FIG. 12 are similar to the steps in the first embodiment.

In step S301 following step S102, the imaging condition setting unit 190 sets a plurality of regions $R_{i(1)}$, $R_{i(2)}$, and $R_{i(3)}$ for estimating a focus tendency of a sample SP. As will be described below, in the third embodiment, a plane is calculated based on a result of imaging for each of the regions $R_{i(1)}$, $R_{i(2)}$, and $R_{i(3)}$. Therefore, three non-collinear points are selected as the regions $R_{i(1)}$, $R_{i(2)}$, and $R_{i(3)}$.

In step S302, the imaging apparatus 1 images each of the regions $R_{i(1)}$, $R_{i(2)}$, and $R_{i(3)}$, while moving the stage 100 according to the condition set by the imaging condition setting unit 190.

In step S303, the focus position calculation unit 170 acquires the result of imaging in step S302, and calculates a focus plane for each of the regions $R_{i(1)}$, $R_{i(2)}$, and $R_{i(3)}$. A method for calculating the focus plane is not limited. For example, in a similar manner as in the first embodiment, a focus position distribution in the regions $R_{i(1)}$, $R_{i(2)}$, and $R_{i(3)}$ may be calculated, and then, an average value of the focus position distribution may be calculated, and a plane containing the average value and being parallel to the XY-plane may be defined as the focus plane. Alternatively, it is also possible to acquire the focus plane by using a representative value such as a maximum value of the focus position distribution, or a statistical value based on an average or dispersion of the distribution, instead of using the average value. Alternatively, in a similar manner as in modification 1-1, the plane where the region being focus with the sample SP has the largest area may be determined as the focus plane. Furthermore, in a similar manner as in the second embodiment, the least-squares plane calculated from the focus position coordinate may be determined as the focus plane.

In step S304, the drive parameter computation unit 180 calculates the focus tendency of the sample SP. In the third embodiment, the drive parameter computation unit 180 acquires representative positions for the regions $R_{i(1)}$, $R_{i(2)}$, and $R_{i(3)}$ as the focus tendency. Using the representative positions and an average height of the focus plane, a plane that corresponds to a wide-area focus plane $P_W$ is calculated. Here, center positions of the regions $R_{i(1)}$, $R_{i(2)}$, and $R_{i(3)}$, or end part positions corresponding to the plurality of regions $R_{i(1)}$, $R_{i(2)}$, and $R_{i(3)}$ may be used as exemplary representative positions.

A plane corresponding to the wide-area focus plane $P_W$ will be given by the following equation, where representative positions of the regions $R_{i(1)}$, $R_{i(2)}$ and $R_{i(3)}$ are (x1, y1), (x2, y2) and (x3, y3) and the average heights of the focus plane are z1, z2, and z3, respectively.

$$\{(y2-y1)(z3-z1)-(y3-y1)(z2-z1)\}(x-x1)+ \qquad (1)$$
$$\{(z2-z1)(x3-x1)-(z3-z1)(x2-x1)\}(y-y1)+$$
$$\{(x2-x1)(y3-y1)-(x3-x1)(y2-y1)\}(z-z1)=0$$

In step S305, the drive parameter computation unit 180 calculates a drive parameter in the Z-direction such that, in the subsequent imaging region, the wide-area focus plane $P_W$ calculated in step S304 is substantially at a center (in a specified range from a center of a height-direction range of the focal plane) with respect to the height-direction range of the focal plane, with the plane being tilted. Since the focus plane in an overall sample SP existence region has been estimated in step S304, an imaging order for regions other than the regions $R_{i(1)}$, $R_{i(2)}$ and $R_{i(3)}$ is not particularly limited.

In step S306, the imaging apparatus 1 images regions other than the regions $R_{i(1)}$, $R_{i(2)}$ and $R_{i(3)}$, while moving the stage 100 in the X-direction as well as adjusting the stage 100 in the Z-direction according to the drive parameter set in step S305.

In step S307, the imaging apparatus 1 determines whether the scan in the X-direction is completed. When the scan in the X-direction is not completed (step S307: No), the operation of the imaging apparatus 1 returns to step S305.

When the scan in the X-direction is completed (step S307: Yes), on the other hand, the imaging apparatus 1 determines whether the scan in the Y-direction is completed (step S308). When the scan is not completed (step S308: No), the imaging apparatus 1 moves the stage 100 in the Y-direction (step S309).

In step S310, the imaging apparatus 1 adjusts the stage 100 in the Z-direction, along with the stage movement in the Y direction. That is, the imaging apparatus 1 moves the stage 100 in the Z-direction such that the wide-area focus plane $P_W$ at a position after movement of the stage 100 is substantially at a center in a height-direction range of the focal plane, with the plane being tilted. Then, the operation of the imaging apparatus 1 proceeds to step S305.

When the scan in the Y-direction is completed (step S308: Yes), the imaging apparatus 1 finishes the operation.

According to the third embodiment as described above, the movement of the stage 100 in the Z-direction is controlled based on the estimation of the wide-range focus plane, making it possible to perform a wide-range imaging efficiently with high accuracy while suppressing the takt time in the imaging with tilt and image formation.

In the above-described third embodiment, the wide-area focus plane formed of a flat surface is calculated based on the result of imaging for the three regions $R_{i(1)}$, $R_{i(2)}$, $R_{i(3)}$. Alternatively, the wide-area focus plane formed of a curved surface may be calculated. The wide-area focus plane formed of a curved surface can be calculated with a least square method, for example. In this case, the number of the plurality of regions to be set for estimating the focus tendency (refer to step S301) may be set as appropriate according to a parameter in a general formula representing a curved surface (such as a quadratic surface).

Modification 3-1

Modification 3-1 of the third embodiment of the present invention will be described in the following.

Figure 14:
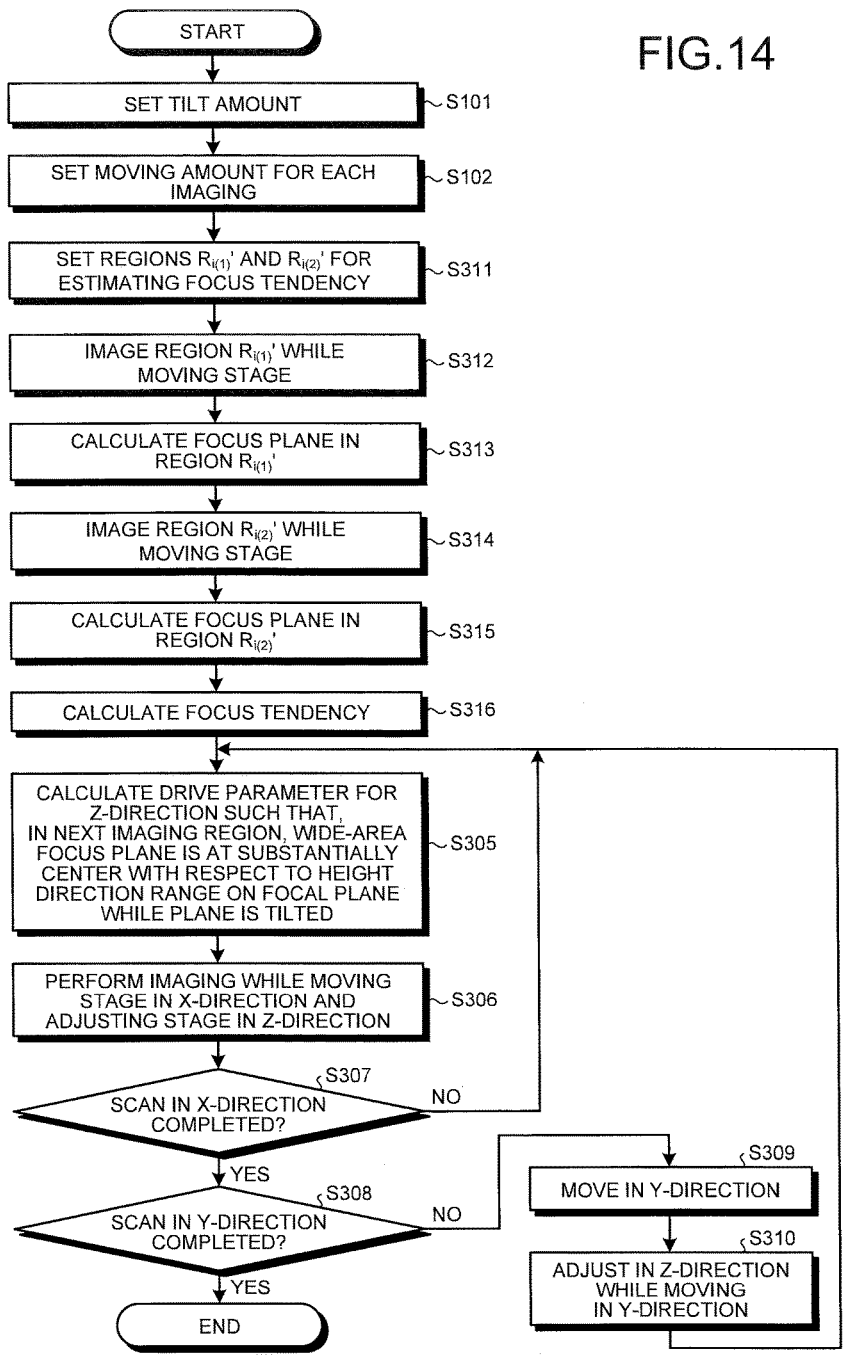
FIG. 14 is a flowchart illustrating an imaging method according to modification 3-1 of the third embodiment of the present invention.
Figure 15:
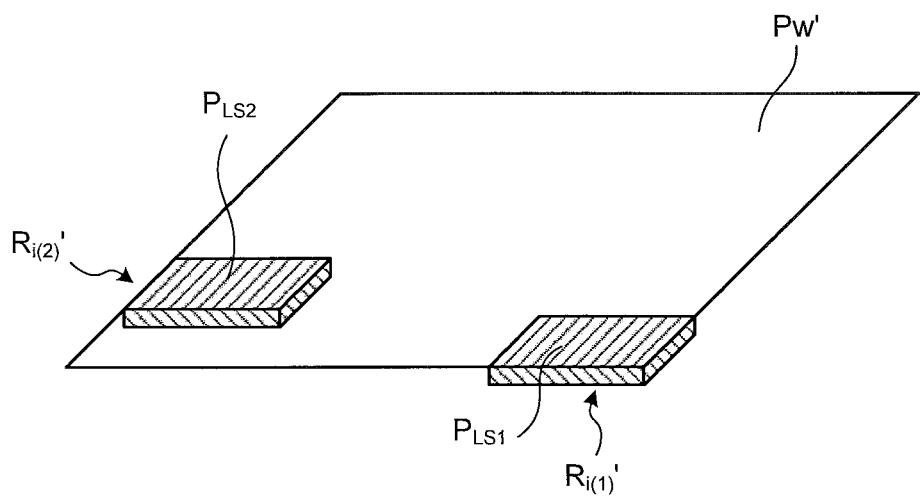
FIG. 15 is a schematic diagram illustrating the imaging method according to modification 3-1.

FIG. 14 is a flowchart illustrating an imaging method according to modification 3-1. FIG. 15 is a schematic diagram illustrating the imaging method according to modification 3-1. A configuration of an imaging apparatus according to modification 3-1 is similar to the configuration of the first embodiment.

Steps S101 and S102 illustrated in FIG. 14 are similar to the steps in the first embodiment. Steps S305 to S310 are similar to the steps in the third embodiment.

In step S311 following step S102, the imaging condition setting unit 190 sets a plurality of regions $R_{i(1)}'$ and $R_{1(2)}'$ for estimating the focus tendency of the sample SP.

In step S312, the imaging apparatus 1 images the region $R_{i(1)}'$ while moving the stage 100 according to the conditions set by the imaging condition setting unit 190.

In step S313, the focus position calculation unit 170 calculates the focus plane $P_{LS1}$ for the region $R_{i(1)}'$. More specifically, the focus position calculation unit 170 acquires a plurality of focus position coordinates in the region $R_{i(1)}'$ based on the result of imaging for the region $R_{i(1)}'$. Based on these focus position coordinates, the least-squares plane is calculated using an ordinary least square method. This least-squares plane is used as a focus plane in the region $R_{i(1)}'$.

In step S314, the imaging apparatus 1 images the other region $R_{i(2)}'$ while moving the stage 100 according to the conditions set by the imaging condition setting unit 190.

In step S315, the focus position calculation unit 170 calculates a focus plane $P_{LS2}$ in the region $R_{i(2)}'$. The focus plane $P_{LS2}$ can be calculated in a similar manner as in step S313.

In step S316, the drive parameter computation unit 180 calculates the focus tendency of the sample SP. In modification 3-1 of the third embodiment, the drive parameter computation unit 180 calculates, as the focus tendency, a wide-area focus plane $P_W'$ based on the focus planes $P_{LS1}$, $P_{LS2}$ in the regions $R_{i(1)}'$, and $R_{i(2)}'$. The wide-area focus plane $P_W'$ can be calculated as an approximate plane for the focus planes $P_{LS1}$ and $P_{LS2}$. The operation of the imaging apparatus 1 then proceeds to step S305.

According to modification 3-1, as described above, the approximate plane for the focus plane (least-squares plane) in the two regions $R_{i(1)}'$ and $R_{i(2)}'$ is estimated as the wide-area focus plane $P_W'$. Accordingly, a focus plane estimation accuracy can be improved. Therefore, the embodiment makes it possible to perform a wide-range imaging efficiently with high accuracy, while suppressing the takt time in the imaging with the tilt and image formation.

An exemplary configuration of a microscope system including the imaging apparatus 1 according to the first to third embodiments will be described below.

Figure 16:
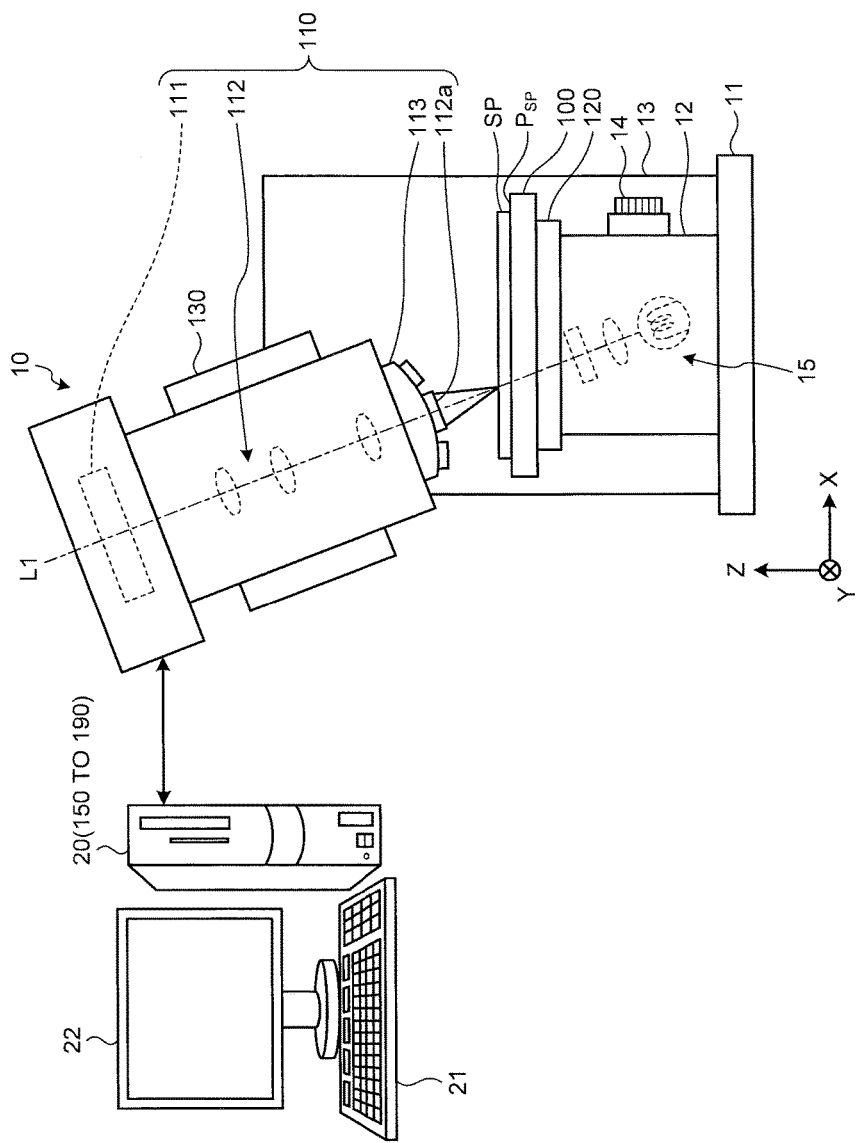
FIG. 16 is a schematic diagram illustrating an exemplary configuration of a microscope system including the imaging apparatus illustrated in FIG. 1.

FIG. 16 is a schematic diagram illustrating an exemplary configuration of the microscope system. As illustrated in FIG. 16, the microscope system includes a microscope 10, and a control apparatus 20 provided with an input apparatus 21 and a display apparatus 22.

The microscope 10 includes a base 11, and a stage base 12 and a support 13 arranged on the base 11. A stage 100 is disposed on the stage base 12 via an XY-drive unit 120. An adjustment knob 14 is provided on the stage base 12 for moving the stage 100 in the Z-direction.

Inside the stage base 12, a transmitted-light illumination optical system 15 is provided to emit illumination light to a sample SP. As a mechanism for illuminating the sample SP, an epi-illumination optical system may be provided instead of the transmitted-light illumination optical system 15.

On the support 13, an imaging unit 110 is provided via a tilt mechanism 130. The imaging unit 110 may further include a lens-exchangeable revolver 113 for retaining a plurality of objective lenses with different magnifications.

The control apparatus 20 contains a general-purpose personal computer or the like that includes a storage unit (not illustrated) and a control unit (not illustrated). The storage unit includes a semiconductor memory, a recording medium, a drive apparatus and the like. The semiconductor memory includes a flash memory, a RAM, and a ROM, for example. The recording medium includes an HDD, an MO, a CD-R, and a DVD-R, for example. The drive apparatus is configured to drive the recording medium. The control unit includes hardware such as a CPU. In the first to third embodiments, the XY-drive controller 150, the Z-drive controller 160, the focus position calculation unit 170, the drive parameter computation unit 180, and the imaging condition setting unit 190 are included in the control apparatus 20.

The storage unit stores, for example, a program for the control apparatus 20 to execute various operations, various information to be used during the execution of the program, and image information that has been output from the imaging unit 110. The control unit reads a program stored in the storage unit, and controls the microscope system to perform an imaging operation based on the various data stored in the storage unit, or based on the various information to be input from the input apparatus 21.

The input apparatus 21 includes an input device, such as a keyboard, a touch panel, and a mouse, and is used by a user for inputting various information to be used on the control apparatus 20.

The display apparatus 22 includes a CRT display, a liquid crystal display or the like.

Figure 17:
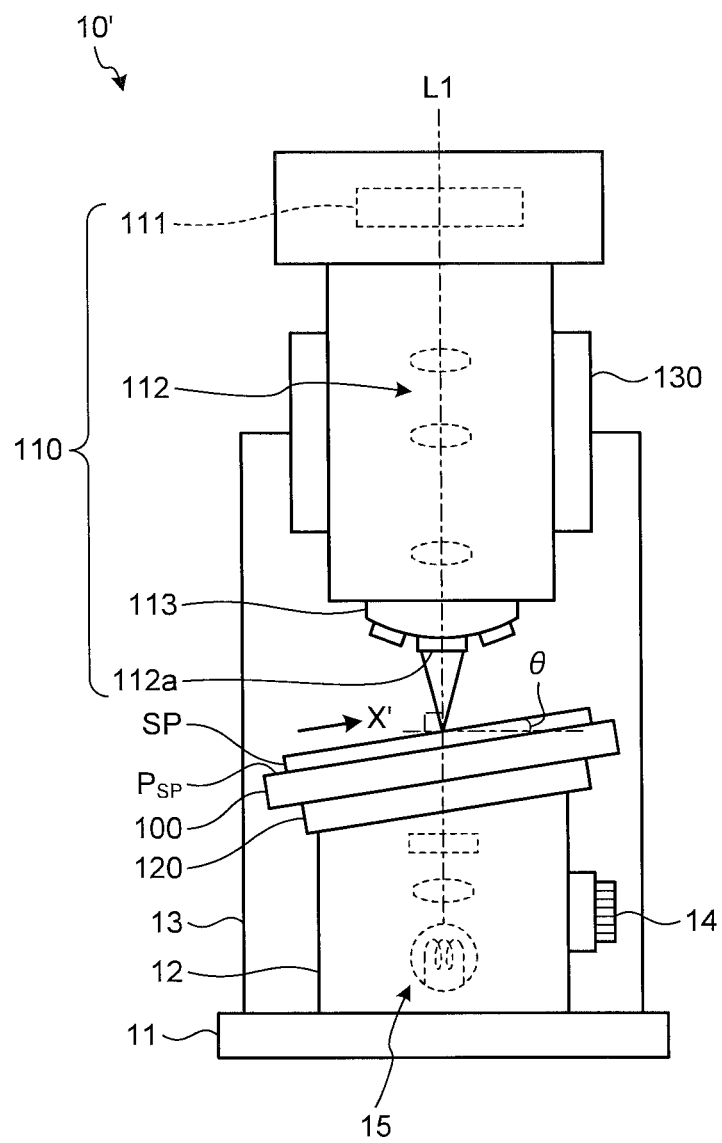
FIG. 17 is a schematic diagram illustrating another exemplary configuration of a microscope system including the imaging apparatus illustrated in FIG. 1.
Figure 18:
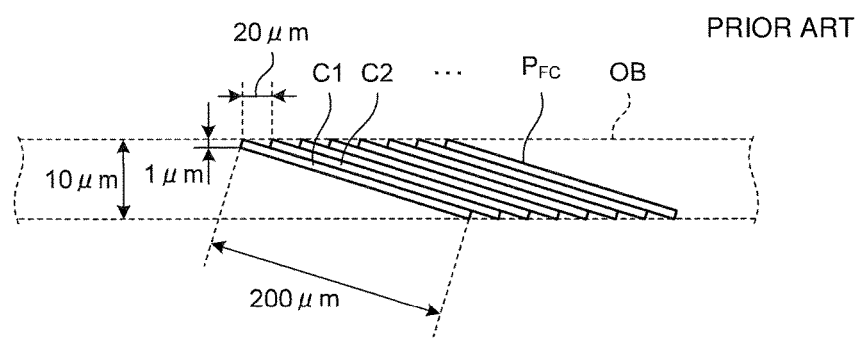
FIG. 18 is a schematic diagram illustrating an imaging operation when a focus plane is tilted to set the range in the Z-direction to 10 µm.
Figure 19:
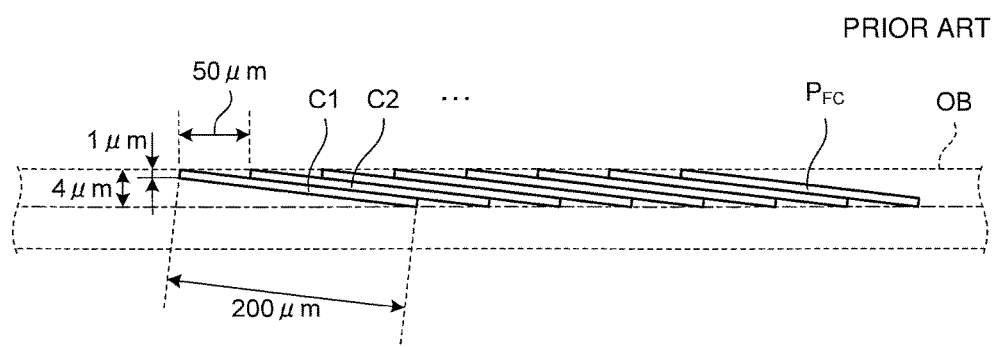
FIG. 19 is a schematic diagram illustrating an imaging operation when a focus plane is tilted to set the range in the Z-direction to 4 µm.

FIG. 17 is a schematic diagram illustrating another exemplary configuration of the microscope system including the imaging apparatus 1 according to the first to third embodiments. In the microscope system including the imaging apparatus 1, a microscope 10' illustrated in FIG. 17 may be used instead of the microscope 10 illustrated in FIG. 16.

In the microscope 10 illustrated in FIG. 16, the stage 100 has been disposed horizontally, and the optical axis L1 of the observation optical system 112 and of the transmitted-light illumination optical system 15 has been tilted with respect to the stage 100. It is also possible, however, as illustrated in FIG. 17, to configure the observation optical system 112 and the transmitted-light illumination optical system 15 to be disposed so that the optical axis L1 is arranged in the vertical direction, with the stage 100 being tilted with respect to the horizontal direction. In this case, imaging is performed by the imaging unit 110 while the stage 100 is moved in the tilt direction of a sample plane P$_{SP}$ (X'-direction).

The above-described first to third embodiments and their modifications are non-limiting examples. Combining a plurality of components disclosed in the first to third embodiments and their modifications makes it possible to achieve various kinds of embodiments of the invention. For example, some components may be omitted from all the components illustrated in the first to third embodiments. Alternatively, different components illustrated in the first to third embodiments may be combined as appropriate.

According to some embodiments, a second moving mechanism is controlled based on information on a first region of an object acquired by imaging with tilt and image formation. This technique makes it possible to adjust an imaging characteristic of observation light on an imaging surface in imaging the second region. Therefore, in imaging with the tilt and image formation for the second region, a focus plane can be reliably acquired independently of a displacement of an object plane in the Z-direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a stage on which an object is configured to be placed;
   a sensor having an imaging surface configured to receive observation light from the object, the sensor configured to tilt about a focal plane relatively with respect to an axis parallel to a direction of movement of a first actuator, the first actuator configured to perform a relative movement between the stage and the sensor along at least one direction within a placement plane for placing the object, wherein a second actuator is configured to perform a relative movement between the stage and the sensor along a direction orthogonal to the placement plane;
   and
   a processor configured to cause the sensor to image a first region of the object while causing the first actuator to operate, acquire information on the first region based on a result of imaging, and calculate a focus tendency of the object, and configured to control the second actuator based on the focus tendency, and adjust an imaging characteristic of the observation light when causing the sensor to image a second region of the object that is different from the first region, the imaging characteristic of the observation light being a focus position of an image of the object formed on the imaging surface, wherein the information on the first region is a distribution of a focus position that is a position where a focus evaluation value indicating a contrast level in the direction orthogonal to the placement plane is the largest, and the distribution is in at least one direction on the placement plane, wherein the processor is configured to calculate a representative value of the distribution of the focus position, and change the imaging characteristic when imaging the second region, based on a relationship between the representative value and a range of the focal plane of the sensor in the direction orthogonal to the placement plane.

2. The imaging apparatus according to claim 1, wherein the processor is configured to adjust the imaging characteristic of the observation light by adjusting a relative positional relationship between the object and a focal point of the sensor in an optical axis direction.

3. The imaging apparatus according to claim 1, wherein the processor is configured to adjust a position of an image of the object formed on the imaging surface by changing a distance between the stage and the sensor.

4. The imaging apparatus according to claim 1, wherein the processor is configured to acquire the distribution of the focus position based on a contrast of a luminance value in the direction orthogonal to the placement plane.

5. The imaging apparatus according to claim 1, wherein the processor is configured to adjust the imaging characteristic of the observation light such that the imaging characteristic changes according to the information on the first region and an amount of movement by the first actuator between the imaging on the first region and the imaging on the second region.

6. An imaging apparatus comprising:
   a stage on which an object is configured to be placed;
   a sensor having an imaging surface configured to receive observation light from the object, the sensor configured to tilt about a focal plane relatively with respect to an axis parallel to a direction of movement of a first actuator, the first actuator configured to perform a relative movement between the stage and the sensor along at least one direction within a placement plane for placing the object, wherein a second actuator is configured to perform a relative movement between the stage and the sensor along a direction orthogonal to the placement plane; and
   a processor configured to cause the sensor to image a first region of the object while causing the first actuator to operate, acquire information on the first region based on a result of imaging, and calculate a focus tendency of the object, and configured to control the second actuator based on the focus tendency, and adjust an imaging characteristic of the observation light when causing the sensor to image a second region of the object that is different from the first region, the imaging characteristic of the observation light being a focus position of an image of the object formed on the imaging surface,
   wherein the processor is configured to: calculate a plane that is parallel to the placement plane and has a largest total area of regions where a focus evaluation value indicating a contrast level in the direction orthogonal to the placement plane is the largest; and change the imaging characteristic when imaging the second region, based on a relationship between the plane having the largest total area and a range of the focal plane of the sensor in the direction orthogonal to the placement plane.

7. The imaging apparatus according to claim 6, wherein the processor is configured to include, in calculation of the total area, only an area of a region that is larger than a specified threshold, among the regions where the focus evaluation value is the largest.

8. An imaging apparatus comprising:
   a stage on which an object is configured to be placed;

a sensor having an imaging surface configured to receive observation light from the object, the sensor configured to tilt about a focal plane relatively with respect to an axis parallel to a direction of movement of a first actuator, the first actuator configured to perform a relative movement between the stage and the sensor along at least one direction within aplacement plane for placing the object, wherein a second actuator is configured to perform a relative movement between the stage and the sensor along a direction orthogonal to the placement plane; and a processor configured to cause the sensor to image a first region of the object while causing the first actuator to operate, acquire information on the first region based on a result of imaging, and calculate a focus tendency of the object, and configured to control the second actuator based on the focus tendency, and adjust an imaging characteristic of the observation light when causing the sensor to image a second region of the object that is different from the first region, the imaging characteristic of the observation light being a focus position of an image of the object formed on the imaging surface, wherein the information on the first region is a distribution of a focus position that is a position where a focus evaluation value indicating a contrast level in the direction orthogonal to the placement plane is the largest, and the distribution is in at least one direction on the placement plane, and wherein the processor is configured to: calculate a regression plane or a regression surface of the distribution of the focus position; estimate a distribution of a focus position at an arbitrary position different from the first region based on the regression plane or the regression surface; and adjust the imaging characteristic based on the estimated distribution of the focus position.

9. An imaging apparatus comprising:

a stage on which an object is configured to be placed;

a sensor having an imaging surface configured to receive observation light from the object, the sensor configured to tilt about a focal plane relatively with respect to an axis parallel to a direction of movement of a first actuator, the first actuator configured to perform a relative movement between the stage and the sensor along at least one direction within a placement plane for placing the object, wherein a second actuator is configured to perform a relative movement between the stage and the sensor along a direction orthogonal to the placement plane; and a processor configured to cause the sensor to image a first region of the object while causing the first actuator to operate, acquire information on the first region based on a result of imaging, and calculate a focus tendency of the object, and configured to control the second actuator based on the focus tendency, and adjust an imaging characteristic of the observation light when causing the sensor to image a second region of the object that is different from the first region, the imaging characteristic of the observation light being a focus position of an image of the object formed on the imaging surface, wherein the information on the first region is a distribution of a focus position that is a position where a focus evaluation value indicating a contrast level in the direction orthogonal to the placement plane is the largest, and the distribution is in at least one direction on the placement plane, and wherein the processor is configured to: cause the sensor to image a plurality of different regions of the object while causing the first actuator to operate; acquire information on each of the plurality of regions from results of imaging; estimate a distribution of a focus position at an arbitrary position other than the plurality of regions based on the information on each of the plurality of regions; and adjust the imaging characteristic based on the estimated distribution of the focus position, and the information on each of the plurality of regions is one of:

a distribution of a focus position in each of the plurality of regions;

a representative value or a statistical value of the distribution of the focus position;

information on a plane that is parallel to the placement plane and has a largest total area of regions where the focus evaluation value indicating the contrast level in the direction orthogonal to the placement plane is the largest; and information on a regression plane or a regression surface of the distribution of the focus position.

10. A microscope system comprising:

an imaging apparatus comprising:

a stage on which an object is configured to be placed;

a sensor having an imaging surface configured to receive observation light from the object, the sensor configured to tilt about a focal plane relatively with respect to an axis parallel to a direction of movement of a first actuator, the first actuator configured to perform a relative movement between the stage and the sensor along at least one direction within a placement plane for placing the object, wherein a second actuator is configured to perform a relative movement between the stage and the sensor along a direction orthogonal to the placement plane; and a processor configured to cause the sensor to image a first region of the object while causing the first actuator to operate, acquire information on the first region based on a result of imaging, and calculate a focus tendency of the object, and configured to control the second actuator based on the focus tendency, and adjust an imaging characteristic of the observation light when causing the sensor to image a second region of the object that is different from the first region, the imaging characteristic of the observation light being a focus position of an image of the object formed on the imaging surface, wherein the information on the first region is a distribution of a focus position that is a position where a focus evaluation value indicating a contrast level in the direction orthogonal to the placement plane is the largest, and the distribution is in at least one direction on the placement plane, wherein the processor is configured to calculate a representative value of the distribution of the focus position, and change the imaging characteristic when imaging the second region, based on a relationship between the representative value and a range of the focal plane of the sensor in the direction orthogonal to the placement plane;

and an illumination unit configured to illuminate the object.

11. An imaging method executed by an imaging apparatus, the imaging apparatus comprising: a stage on which an object is configured to be placed; an sensor having an imaging surface configured to receive observation light from the object, the sensor configured to tilt about a focal plane relatively with respect to an axis parallel to a direction of movement of a first actuator; the first actuator configured to perform a relative movement between the stage and the sensor along at least one direction within a placement plane for placing the object; and a second actuator configured to perform a relative movement between the stage and the sensor-along a direction orthogonal to the placement plane, the method comprising:
  causing the sensor to image a first region of the object while causing the first actuator to operate;
  acquiring information on the first region based on a result of imaging;
  calculating a focus tendency of the object;
  controlling the second actuator based on the focus tendency; and
  adjusting an imaging characteristic of the observation light when causing the sensor to image a second region of the object that is different from the first region, the imaging characteristic of the observation light being a focus position of an image of the object formed on the imaging surface, wherein the information on the first region is a distribution of a focus position that is a position where a focus evaluation value indicating a contrast level in the direction orthogonal to the placement plane is the largest, and the distribution is in at least one direction on the placement plane, wherein the processor is configured to calculate a representative value of the distribution of the focus position, and change the imaging characteristic when imaging the second region, based on a relationship between the representative value and a range of the focal plane of the sensor in the direction orthogonal to the placement plane.

* * * * *